(12) United States Patent
Siusta

(10) Patent No.: US 10,503,980 B2
(45) Date of Patent: *Dec. 10, 2019

(54) SYSTEM AND METHOD FOR AUTOMATIC CATEGORIZATION OF AUDIO/VIDEO CONTENT

(71) Applicant: Advanced Digital Broadcast S.A., Bellevue (CH)

(72) Inventor: Damian Siusta, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,898

(22) Filed: Oct. 29, 2018

(65) Prior Publication Data

US 2019/0130194 A1    May 2, 2019

(30) Foreign Application Priority Data

Oct. 31, 2017 (EP) ..................... 17199376

(51) Int. Cl.
*G06K 9/00* (2006.01)
*H04N 21/44* (2011.01)
(Continued)

(52) U.S. Cl.
CPC ..... *G06K 9/00751* (2013.01); *G06K 9/00758* (2013.01); *G06K 9/00765* (2013.01);
(Continued)

(58) Field of Classification Search
CPC ....... H04N 21/44008; H04N 21/23418; H04N 21/4394; H04N 21/812; H04N 21/8358; H04N 21/8455; H04N 5/76; H04N 21/23424; H04N 21/44016; H04N 21/8456; H04N 5/04; H04N 21/2668; G11B 27/28; G11B 27/031; G11B 27/105;
(Continued)

(56) References Cited

U.S. PATENT DOCUMENTS

2006/0187358 A1* 8/2006 Lienhart ............ G06K 9/00711
348/661
2006/0195860 A1* 8/2006 Eldering ............ G06K 9/00711
725/19
(Continued)

*Primary Examiner* — Hung Q Dang
(74) *Attorney, Agent, or Firm* — Mark M. Friedman

(57) ABSTRACT

Method for categorization of audio/video content, the method comprising the steps of: detecting a start and an end of at least one advertisements block present in said audio and/or video content; for each detected advertisements block: selectively collecting audio and/or video data frames, from said audio and/or video content, within specified time intervals prior to said detected advertisements block; for each time interval, computing a fingerprint; selectively collecting reference audio and/or video data frames, after said advertisements block, for comparison and computing a reference fingerprint for said reference audio and/or video data frames; comparing said reference fingerprint with at least one fingerprint collected prior to the start of said advertisements block in order to obtain a level of similarity between said fingerprints; based on the level of similarity, taking a decision whether to indicate a split point between content items present in said audio/video content.

10 Claims, 14 Drawing Sheets

(51) Int. Cl.
    *H04N 21/81*     (2011.01)
    *H04N 21/454*     (2011.01)
    *H04N 21/845*     (2011.01)

(52) U.S. Cl.
    CPC ... *H04N 21/44008* (2013.01); *H04N 21/4542* (2013.01); *H04N 21/812* (2013.01); *H04N 21/8456* (2013.01)

(58) Field of Classification Search
    CPC ........... G06K 9/00711; G06K 9/00758; G06K 9/00744; A61B 5/7232
    USPC ................................. 386/239–262, 291–299
    See application file for complete search history.

(56) References Cited

U.S. PATENT DOCUMENTS

2016/0337691 A1* 11/2016 Prasad ................. H04N 21/812
2018/0278999 A1*  9/2018 David ................. H04N 21/4622

\* cited by examiner

SYSTEM AND METHOD FOR AUTOMATIC CATEGORIZATION OF AUDIO/VIDEO CONTENT

TECHNICAL FIELD

The present invention relates to a system and method for automatic categorization of audio/video content. In particular the present invention relates to categorization, trimming and splitting of audio/video content.

BACKGROUND OF THE INVENTION

Prior art defines so called digital video recorders (DVR), that may be programmed to record an event at specified time. This is typically done by manually entering start and end time of a recording or by selecting an appropriate event entry in an electronic program guide (EPG) comprising information related to airing of different events on different channels.

When a user has entered the recording time and channel, typically there is assumed so-called recording lead-in and lead-out time customarily set within a range of 5 to 15 minutes for both parameters respectively.

Use of an EPG allows a user to specify recording a series of programs. The DVR can access the EPG to find each instance of that program that is scheduled. In more advanced implementations a use of the EPG may allow the DVR to accept a keyword from the user and identify programs described in the EPG by the specified keyword or automatically schedule recordings based on user's preferences.

A drawback, of scheduling recording by time only, is that frequently the aired events have a varying duration. This may either be decreased duration (for example a sport event may be shortened due to bad weather conditions, an accident or other reasons) or extended duration (for example an extra time of a match).

Further, in addition to shortening or extending a program it may not start on time but rather later (sometimes sooner). This may further lead to inefficient use of storage space.

In order to address the aforementioned drawbacks, prior art defines solutions presented below.

A publication of "Controlling recording of programs", EP 2490443 B1 discloses a DVR, or other recording device, that does not require the user to deal with excess recording data. Embodiments of the invention may rely on receiving accurate timestamps after the broadcast of a program, for example on an out of band channel or internet connection, to a user recording device. The recording device may then automatically remove, or trim, any excess program data from the start and/or the end of the recordings.

A disadvantage of this system is that it relies on additionally provided data over a communication interface. Thus, the receiver device is externally instructed to remove certain sections of the audio/video content. Therefore, it is a burden on the broadcaster's side to indicate actual airing times and to provide such out of band channel or internet connection support.

The aim of the development of the present invention is an improved (as outlined above) system and method for automatic categorization of audio/video content.

SUMMARY AND OBJECTS OF THE PRESENT INVENTION

A first object of the present invention is a method for automatic categorization of content of an audio/video data stream, the method comprising the steps of: accepting a request to execute said categorization of said content of an audio/video data stream; detecting a start and an end of at least one advertisements block present in said audio and/or video data stream; for each detected advertisements block: selectively collecting audio and/or video data frames, from said audio and/or video data stream, within specified time intervals ($T_{CI}$) prior to said detected advertisements block; for each time interval, for which audio and/or video data frames have been selectively collected, computing a fingerprint; selectively collecting reference audio and/or video data frames, after said advertisements block, for comparison and computing a reference fingerprint for said reference audio and/or video data frames; comparing said reference fingerprint with at least one fingerprint collected prior to the start of said advertisements block in order to obtain a level of similarity between said fingerprints; based on the level of similarity, taking a decision whether to indicate a split point between distinct content items present in said audio/video data stream.

Preferably, said selective collecting concerns collecting N of consecutive video data frames at defined timings.

Preferably, a type of said video data frame is taken into consideration during said selective collecting (IDR, I-frame).

Preferably, said fingerprint is a data set, smaller than the referred data, that may be compared in order to determine a similarity level with another fingerprint.

Preferably, when determining said level of similarity there is executed one of: computing an average similarity level among all fingerprints pairs; selecting a subset of top results; setting a threshold for a top result.

Preferably, at least one of said time intervals falls after said end of the advertisements block.

Preferably, said an audio/video data stream is initially processed so that each advertisements section is removed in order to arrive at an output content.

Preferably, the original timing information is preserved and it is known to the system to which time in the audio/video data stream the respective parts of the output content correspond.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

A further object of the present invention is a system executing the method of the invention.

BRIEF DESCRIPTION OF THE DRAWINGS

These and other objects of the invention presented herein, are accomplished by providing a system and method for automatic adjustment of scheduled recording time. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The following specification refers to an audio/video data signal but video only or audio only data signals may be processed in the same manner.

Figure 1:
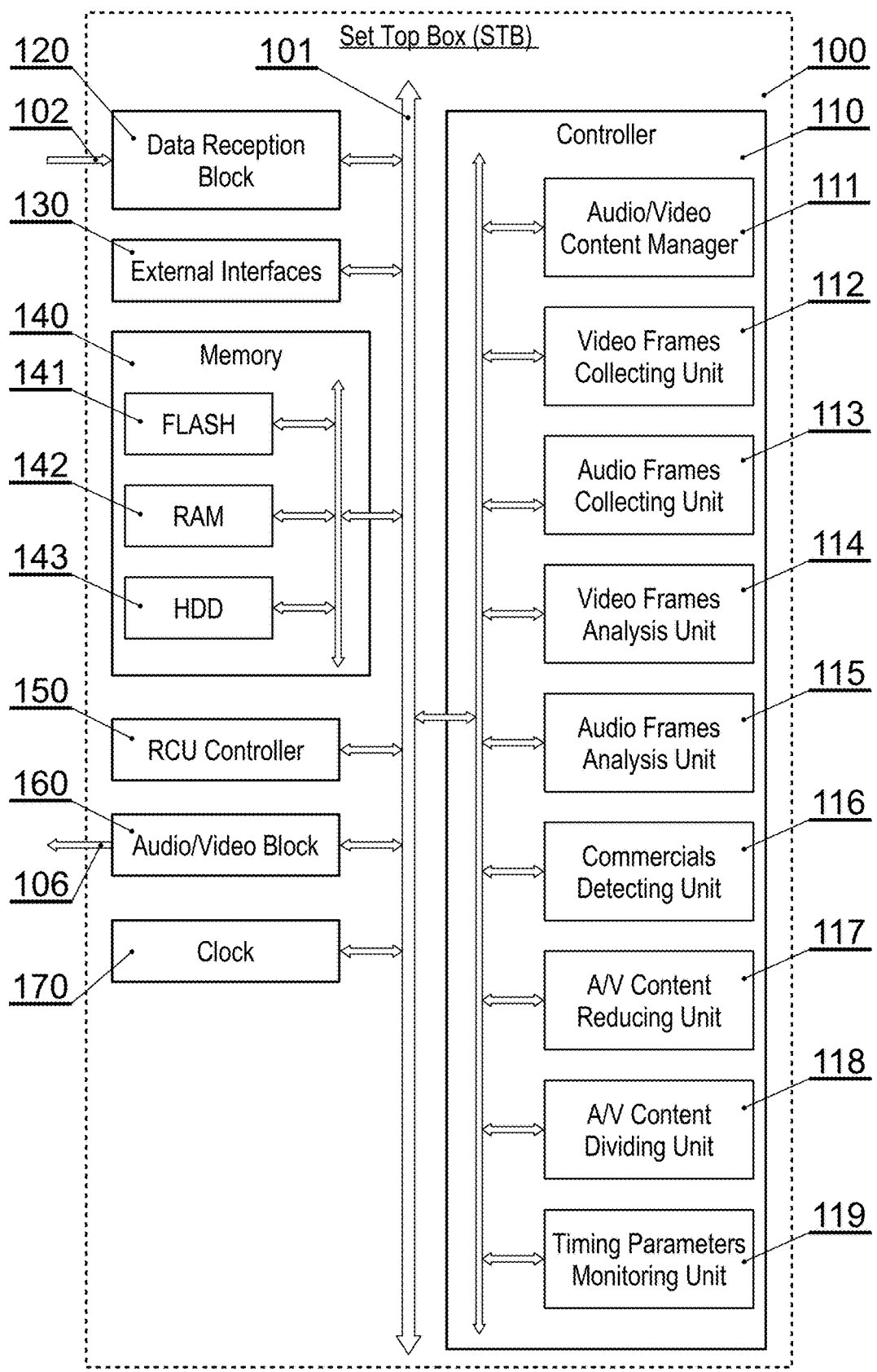
FIG. 1 presents a diagram of the system according to the present invention.

FIG. 1 presents a diagram of the system according to the present invention. The system is an audio/video receiver, which in this case may be a set-top box (STB) (100).

The STB (100) receives data (102) via a suitable data reception block (120) which may be configured to receive satellite and/or terrestrial and/or cable and/or Internet data.

An external interfaces module (130) typically responsible for bidirectional communication external devices (e.g. using wireless interface e.g. Wi-Fi, UMTS, LTE, Bluetooth, USB or the like). Other typical modules include a memory (140) (which may comprise different kinds of memory such as flash (141) and/or RAM (142) and/or HDD (143)) for storing data (including software, recordings, temporary data, configuration and the like) as well as software executed by a controller (110), a clock module (170) configured to provide clock reference for other modules of the system, and an audio/video block (160) configured to process audio/video data, received via the data reception block (120), and output an audio/video signal by means of an audio/video output interface (106).

Further, the STB (100) comprises a remote control unit controller (150) configured to receive commands from a remote control unit (typically using an infrared communication).

The controller (110) comprises an Audio/Video Content Manager (111) responsible for maintaining lists of executed and scheduled recordings as well as information on current live recordings. Typically, this will involve references to content as well as metadata describing scheduled recordings by channel and time.

A Video Frames Collecting Unit (112) is a sampling module configured for selectively reading video samples into a buffer, which is subsequently analyzed. A corresponding Audio Frames Collecting Unit (113) may by applied to collect relevant audio data.

A Video Frames Analysis Unit (114) is configured to evaluate data collected by the Video Frames Collecting Unit (112) and to generate a video fingerprint for a video data frame or typically for a group (or otherwise a sequence) of video data frames. Said video fingerprint is typically a reasonably sized (significantly smaller than the referred data) data set that may be efficiently compared in order to determine a similarity level with another video fingerprint.

The methods employed to generate such video fingerprints are beyond the scope of the present invention but the following or similar methods may be utilized in order to execute this task:

- "Method and Apparatus for Image Frame Identification and Video Stream Comparison"—US 20160227275 A1;
- "Video entity recognition in compressed digital video streams"—U.S. Pat. No. 7,809,154B2;
- "Video comparison using color histograms"—U.S. Pat. No. 8,897,554 B2.

An Audio Frames Analysis Unit (115) is configured to evaluate data collected by the Audio Frames Collecting Unit (113) and to generate an audio fingerprint for an audio data frame or typically for a group (or otherwise a sequence) of audio data frames. Said audio fingerprint is typically a reasonably sized (significantly smaller than the referred data) data set that may be efficiently compared in order to determine a similarity level with another audio fingerprint.

The methods employed to generate such audio fingerprints are beyond the scope of the present invention but the following or similar methods may be utilized in order to execute this task:

- "Audio fingerprinting"—U.S. Pat. No. 9,286,902 B2.

Herein, based on fingerprints, a machine may determine a likelihood that a candidate audio data matches a reference audio data and cause a device to present the determined likelihood;

"Audio identification using wavelet-based signatures"—U.S. Pat. No. 8,411,977 B1. This system takes an audio signal and converts it to a series of representations. These representations can be a small set of wavelet coefficients. The system can store the representations, and the representations can be used for matching purposes;

"Music similarity function based on signal analysis"—U.S. Pat. No. 7,031,980 B2. This invention's spectral distance measure captures information about the novelty of the audio spectrum. For each piece of audio, the invention computes a "signature" based on spectral features;

"System and method for recognizing audio pieces via audio fingerprinting"—U.S. Pat. No. 7,487,180 B2. Herein, a fingerprint extraction engine automatically generates a compact representation, hereinafter referred to as a fingerprint of signature, of the audio file, for use as a unique identifier of the audio piece.

In certain embodiments of the present invention there may only be present Video Frames Collecting Unit (112) coupled to the Video Frames Analysis Unit (114) or alternatively only the Audio Frames Collecting Unit (113) coupled to the Audio Frames Analysis Unit (115).

Another module, of the controller (110), is a Commercials Detecting Unit (116) configured to detect advertising blocks present in the received data. It is irrelevant whether such blocks are signaled or not. The methods employed to detect such advertising blocks are beyond the scope of the present invention but the following or similar methods may be utilized in order to execute this task:

"Advertisement detection"—U.S. Pat. No. 9,147,112 B2;

"Method and system of real-time identification of an audiovisual advertisement in a data stream"—U.S. Pat. No. 8,116,462 B2;

"Detecting advertisements using subtitle repetition"—U.S. Pat. No. 8,832,730 B1.

An A/V Content Reducing Unit (117) is responsible for trimming and/or cutting audio/video content according to specified parameters (i.e. locations in a given audio/video content).

An A/V Content Dividing Unit (118) is configured to split a given audio/video content data stream into two or more portions and store such portions accordingly.

Figure 2:
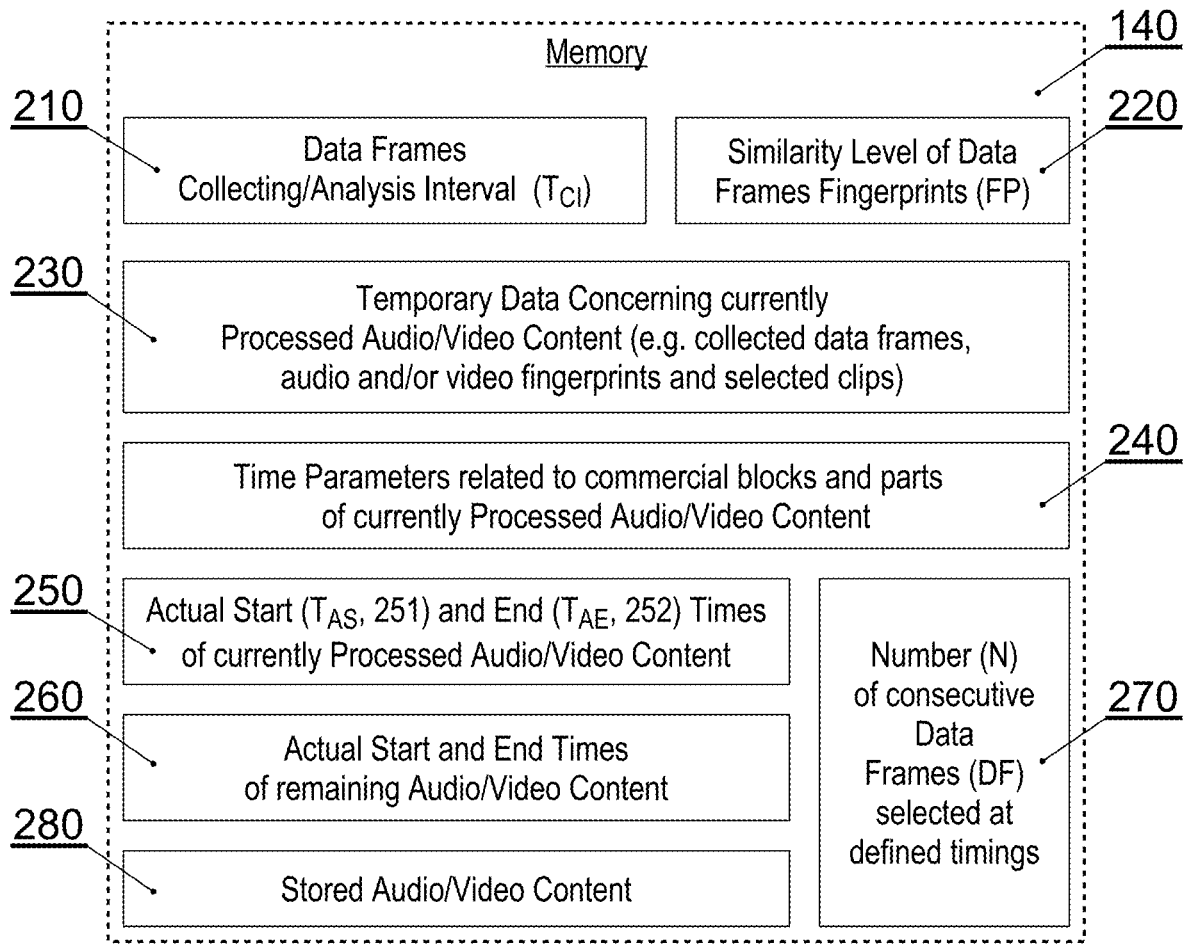
FIG. 2 presents a diagram of memory content.
Figure 3:
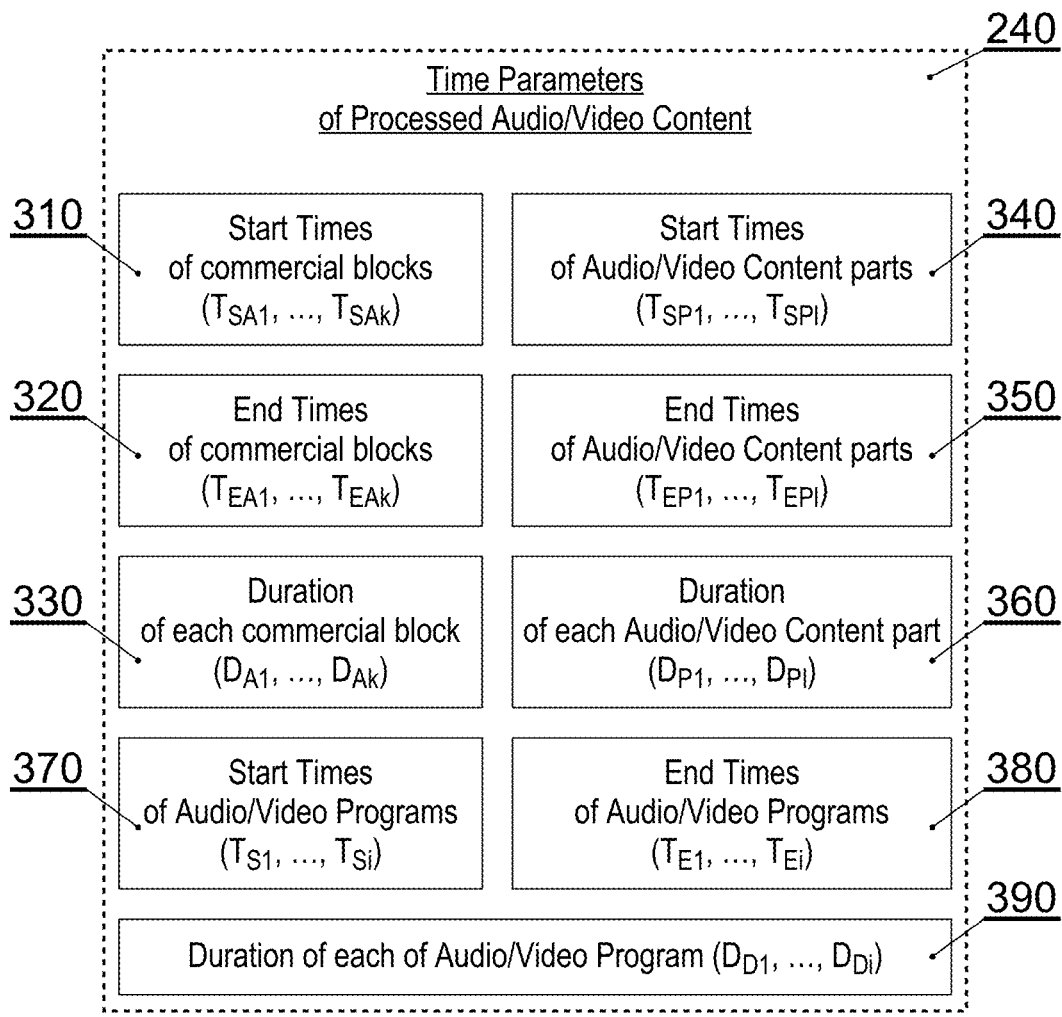
FIG. 3 presents Time Parameters of Processed Audio/Video Content.

Another module of the controller (110) is a Timing Parameters Monitoring Unit (119) configured to monitor system clock(s) with respect to system configuration presented in more details in FIG. 2 and FIG. 3.

FIG. 2 presents a diagram of memory (140) content related to system's configuration and temporary data. A Data Frames Collecting/Analysis Interval ($T_{CI}$) (210) section refers to parameters applicable to data intervals during which data frames may be collected. This parameter is useful in order to limit the amount of processed data.

The next section refers to Similarity Level of Data Frames Fingerprints (220) (Similarity Level of Video and/or Audio Frames Fingerprints where applicable). Threshold values may be stored here that will delimit matching frames or sequences from differing frames or sequence (be it video or audio or audio/video). Such threshold will typically be expressed in percentage.

Further, the memory (140), comprises Temporary Data Concerning currently processed audio/video content (e.g. collected data frames, audio and/or video fingerprints, selected clips) (230).

Another section of the memory (140) comprises information on Time Parameters related to commercial blocks and delimited parts of currently Processed Audio/Video Content (e.g. Start and End Times of a commercial block or Start and its Duration) (240).

Actual Start ($T_{AS}$, 251) and End ($T_{AE}$, 252) Times of a currently Processed Audio/Video Content are stored in memory section (250). This is based on internal clock and denotes recording execution times such as from 17:15 to 18:00.

Similarly, Actual Start and End Times of remaining Audio/Video Content (260) may be stored for all other audio/video content be it live or already recorded.

The next section, of the memory (140), refers to content of the stored recordings (280) while the section (270) defines a Number (N) of consecutive Data Frames selected at defined timings. This is the number used by the Audio Frames Collecting Unit (113) and the Video Frames Collecting Unit (112) in order to sample frames within said predefined timing intervals. Additionally said video or audio fingerprint will be calculated over said N data frames (270).

The system may also allow selection of the type of said N frames, i.e. for example IDR frames (instantaneous decoding refresh) or I frames only may be collected. Other scenarios of frames selection are also possible, for example with respect to audio data, N may express a duration of audio samples in seconds.

FIG. 3 presents Time Parameters of Processed Audio/Video Content (240). The first parameter type are Start Times of commercial blocks ($T_{SA1}, \ldots, T_{SAk}$) (310), which defines points in time where each of identified commercial blocks starts.

Similarly, End Times of commercial blocks ($T_{EA1}, \ldots, T_{EAk}$) (320), define points in time where each of identified commercial blocks ends.

Optionally, there may be given Duration of each commercial block ($D_{A1}, \ldots, D_{Ak}$) (330).

Further, the memory comprises (340) Start Times of Audio/Video Content parts ($T_{SP1}, \ldots, T_{SPI}$) and correspondingly End Times of Audio/Video Content parts ($T_{EP1}, \ldots, T_{EPI}$) (350).

Optionally, there may be given Duration of each Audio/Video Content part ($D_{P1}, \ldots, D_{PI}$) (360).

Further, the memory comprises (370) Start Times of detected different Audio/Video programs ($T_{S1}, \ldots, T_{Si}$) and correspondingly End Times of detected different Audio/Video programs ($T_{E1}, \ldots, T_{Ei}$) (380).

Optionally, there may be given Duration of each detected different Audio/Video program ($D_{D1}, \ldots, D_{Di}$) (390).

It is to be noted that an audio/video program may comprise one or more audio/video content parts (340, 350).

Figure 4:
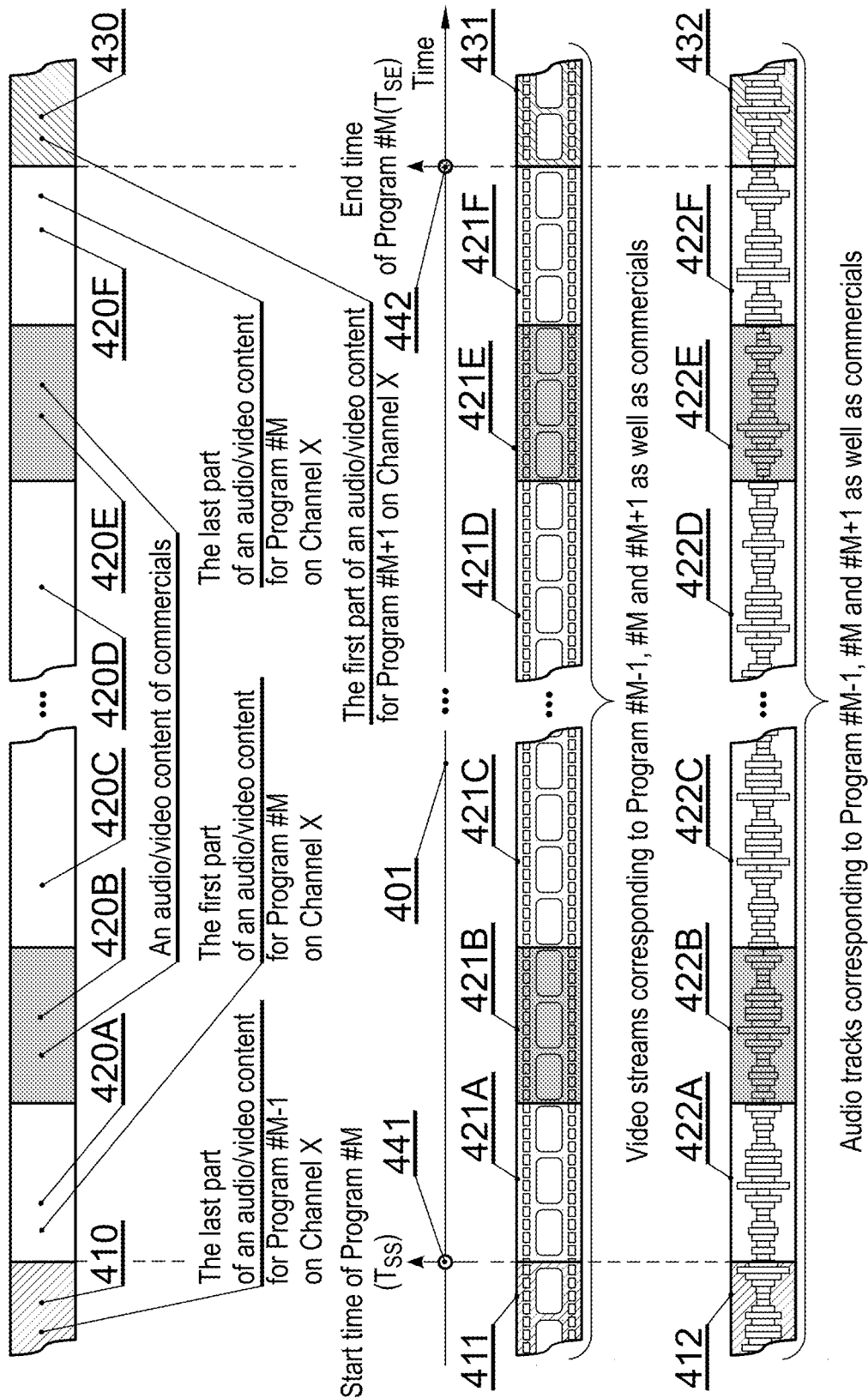
FIG. 4 is an overview of an audio/video data stream.

FIG. 4 is an overview of an audio/video data stream shown with respect to a time axis (401). The audio/video data stream comprises at least one video data stream corresponding to events such as Program #M−1, #M and #M+1 as well as commercials. Additionally, the audio/video data stream comprises at least one audio track corresponding to events such as Program #M−1, #M and #M+1 as well as commercials.

Said Program #M−1, #M and #M+1 have been marked as (410, 420, 430) respectively.

The program #M has signaled start and end times ($T_{SS}$, $T_{SE}$) as per data stored in the memory block (240). The program #M (420) spans between time (241) and (242) and comprises data sections (420A-420F) that include video data sections (421A-421F) as well as audio data sections (422A-422F). Among the video data sections (421A-421F) there are sections related to commercials/advertising (421B, 421E) with corresponding audio data sections (422B, 422E). The remaining sections (420A, 420C, 420D, 420F) correspond to normal audio/video content of the programming event.

Figure 5:
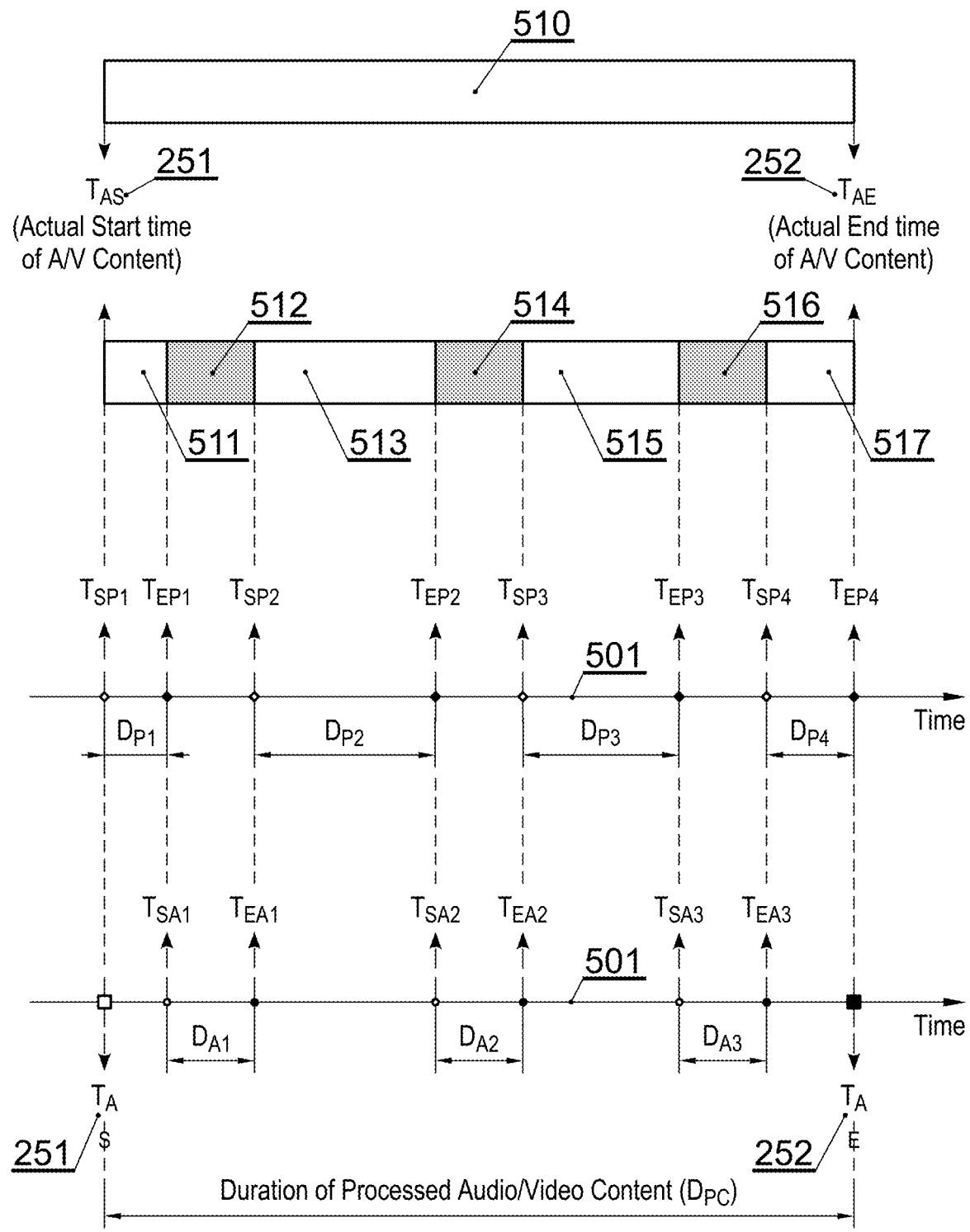
FIG. 5 depicts a graphical representation of Time Parameters of a Processed Audio/Video Content.

FIG. 5 depicts a graphical representation of Time Parameters of a Processed Audio/Video Content (510). It is to be noted that it is irrelevant what is a source if the processed audio/video content (510) and it may be a time shift buffer, live recording buffer, locally stored content or externally stored content.

The processed audio/video content (510) comprises different sections of advertisements blocks and regular programming content. In principle the receiver is not aware when precisely the advertisements blocks are positioned and when other parts of the content are present in the data stream. As a result the receiver is also unaware when different programs precisely start and end.

Thus, the purpose of the present invention is to determine different timing characteristics of the processed audio/video content (510). When these characteristic information is determined, it forms an information package presented in an example in FIG. 5.

The processed audio/video content (510) has an actual start time $T_{AS}$ (251) and end time $T_{AE}$ (252). In this content (510) the system identifies commercial blocks (512, 514, 516) and treats the remaining blocks (511, 513, 515, 517) as program content sections/parts, which may belong to different television programs.

Each advertisements section (512, 514, 516) is delimited with a $T_{SAx}$ start time and $T_{EAx}$ end time as well as with an optional $D_{Ax}$ duration information.

Similarly, each of the remaining blocks (511, 513, 515, 517) is delimited with a $T_{SPx}$ start time and $T_{EPx}$ end time as well with an optional $D_{Px}$ duration information.

Figure 6:
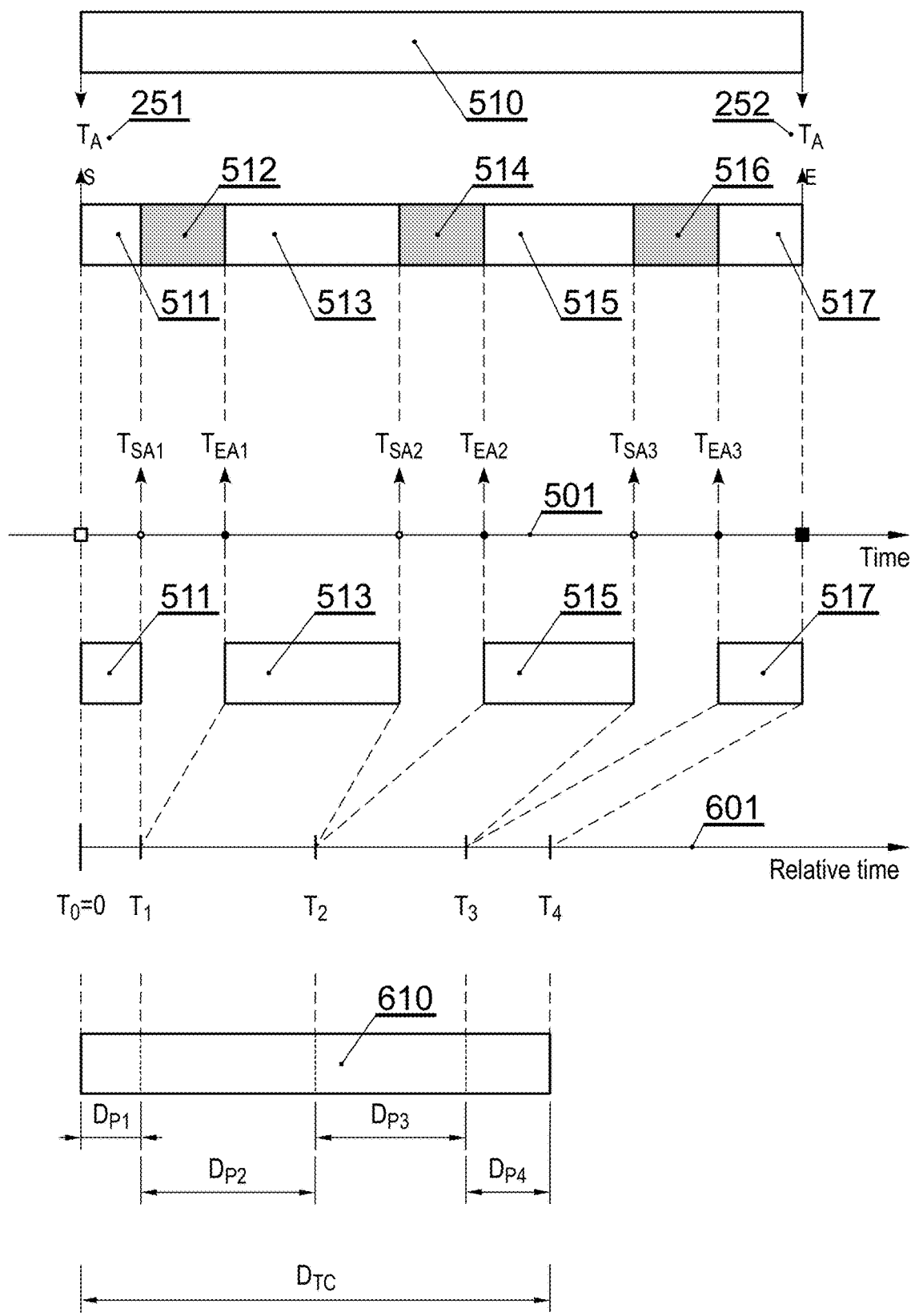
FIG. 6 depicts a graphical representation of the analyzed audio/video content.

FIG. 6 depicts a graphical representation of the analyzed audio/video content. Each advertisements section (512, 514, 516) has been removed in order to arrive at content (610) listing only programming sections and excluding the advertisements section. Naturally, the original timing information is still preserved and it is known to the system to which time in the processed audio/video content (510) the respective parts of the content (610) correspond. Further, there is not any need to create a copy of all data (although it is possible) but appropriate pointers may be used to the original processed audio/video content (510).

Figure 7A:
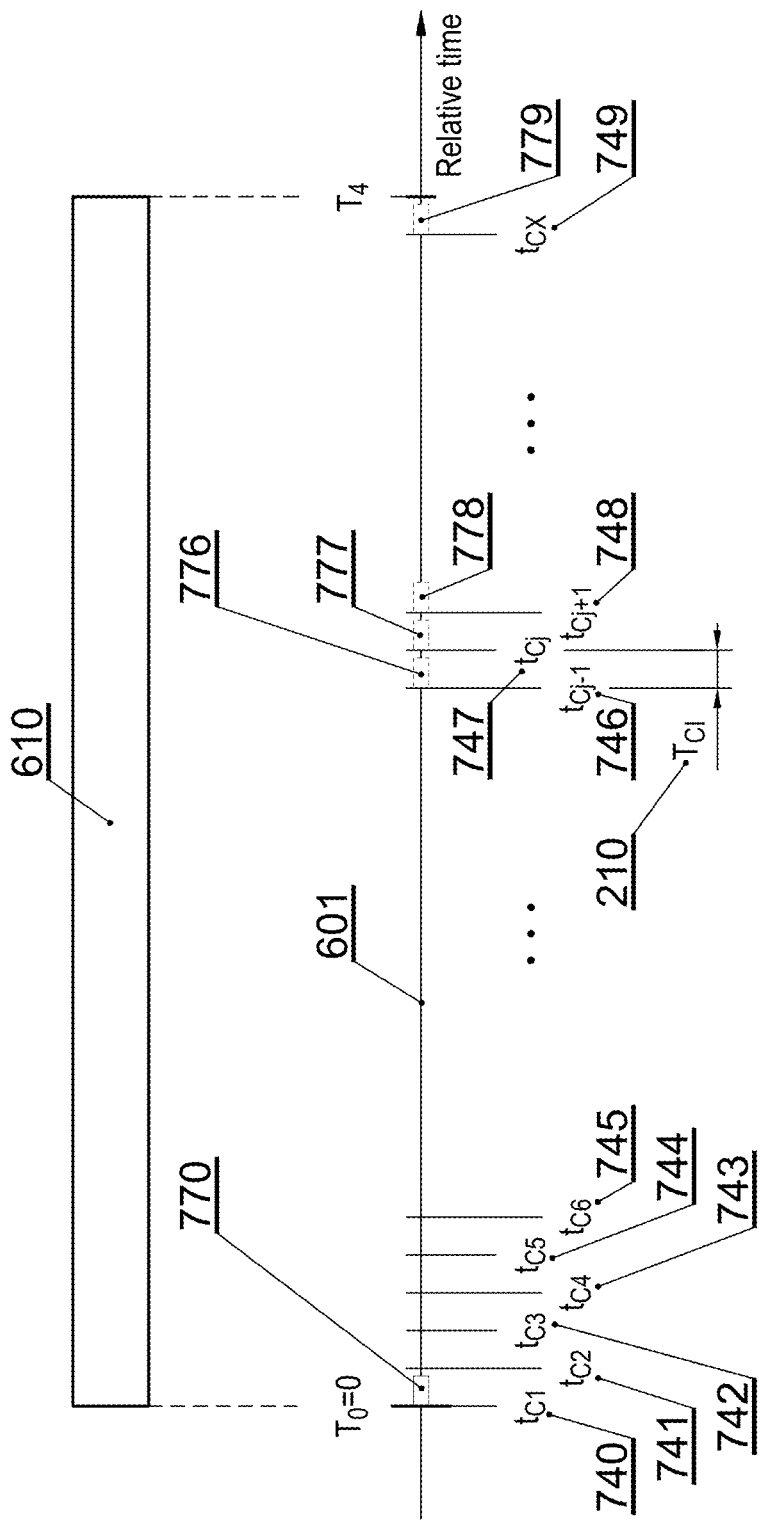
FIGS. 7A-B depict data acquisition and analysis scenarios.
Figure 7B:
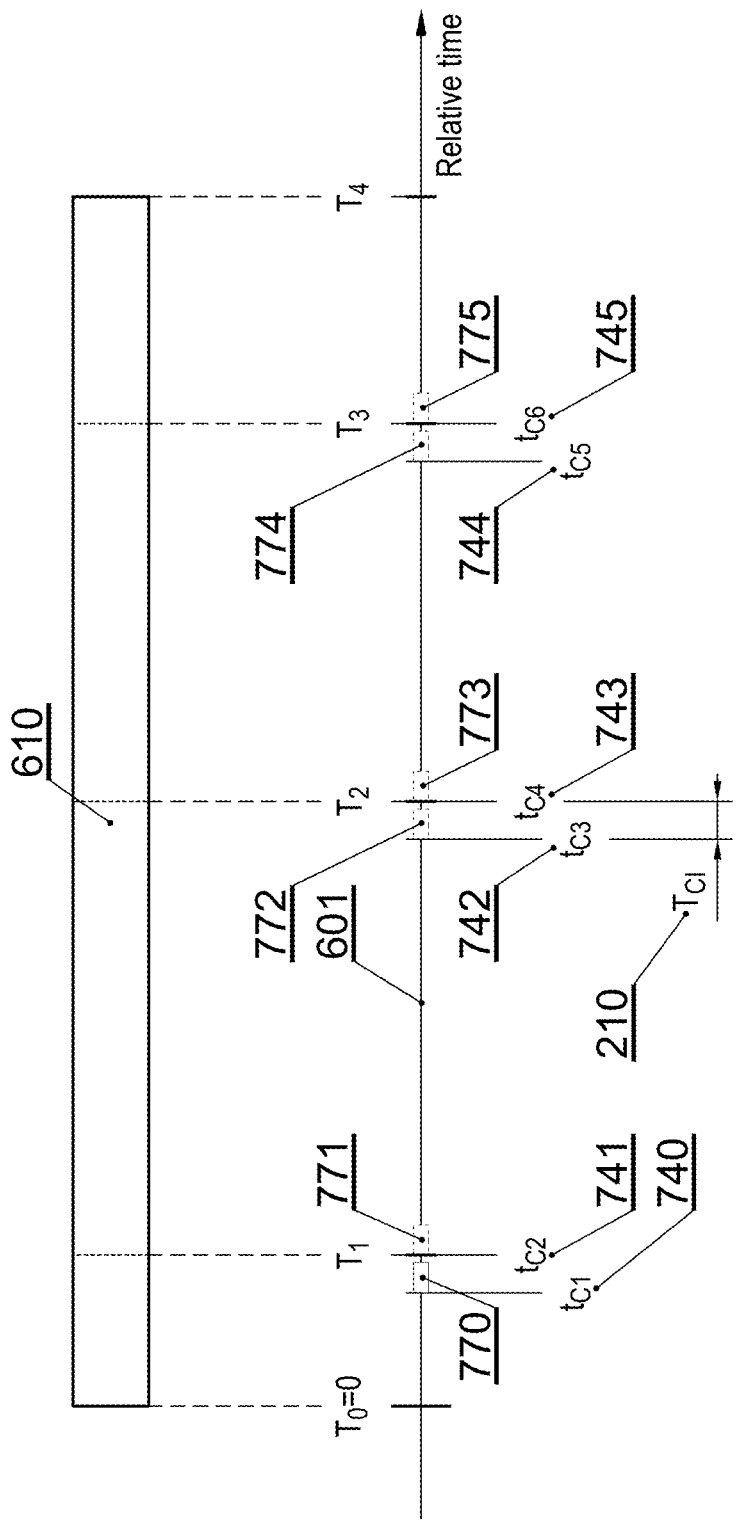

FIGS. 7A-B depict data acquisition and analysis scenarios. FIG. 7A depicts a normal processing scenario, in which for each time interval $t_{Cj}$ (740-749) there is executed selective collecting of audio and/or video data frames (770-779), from said audio and/or video data stream, within specified time intervals. For each time interval, for which audio and/or video data frames have been selectively collected, there is executed computing a fingerprint (in the content (610) such time interval does not fall within any advertisements block).

In a first embodiment of the present invention, only audio fingerprints are computed, while in a second embodiment only video fingerprints are computed, while in a third embodiment both audio and video fingerprints are computed for a given set of N frames.

FIG. 7B depicts another data acquisition and analysis scenario. In particular, the system is aware when said advertisements blocks have been removed ($T_1$, $T_2$, $T_3$) from the content (610) and analyzes content in proximity to these points in time. In a more preferred embodiment at least one data fingerprint is selectively collected for comparison for data subsequent to such time ($T_1$, $T_2$, $T_3$); and at least one data fingerprint is collected prior to the start of said advertisements block ($T_1$, $T_2$, $T_3$).

It is typical that broadcasters input advertisements blocks between two distinct programs, thus a presence of an advertisements block may be an indicator of a potential content change between distinct programs. Nevertheless, this may not always be true and in such cases the iterative approach according to FIG. 7A may provide better results.

Figure 8A:
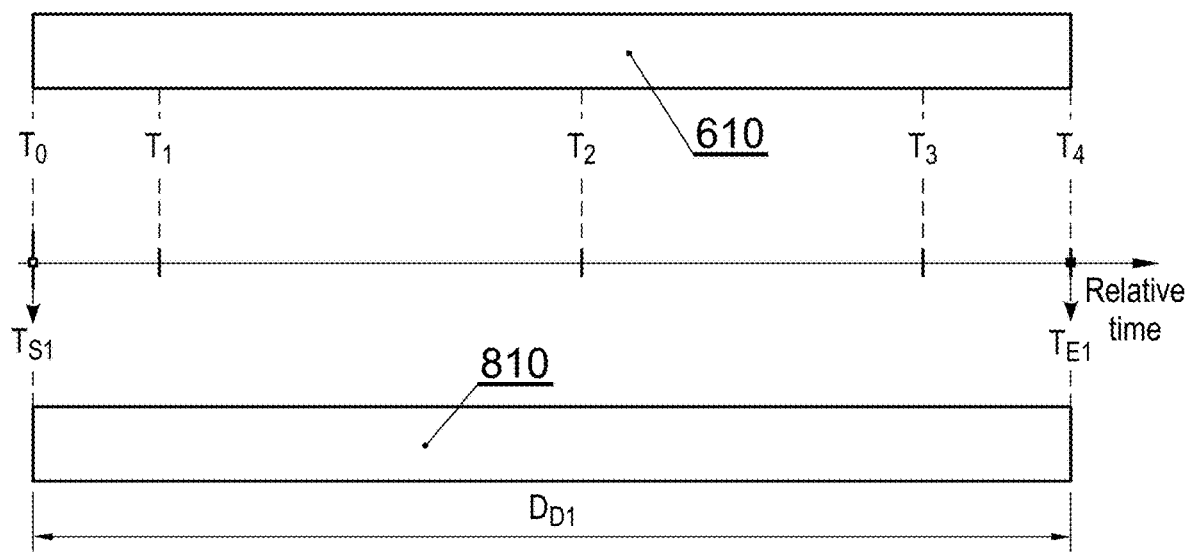
FIGS. 8A-D present different outcomes of analysis.
Figure 8B:
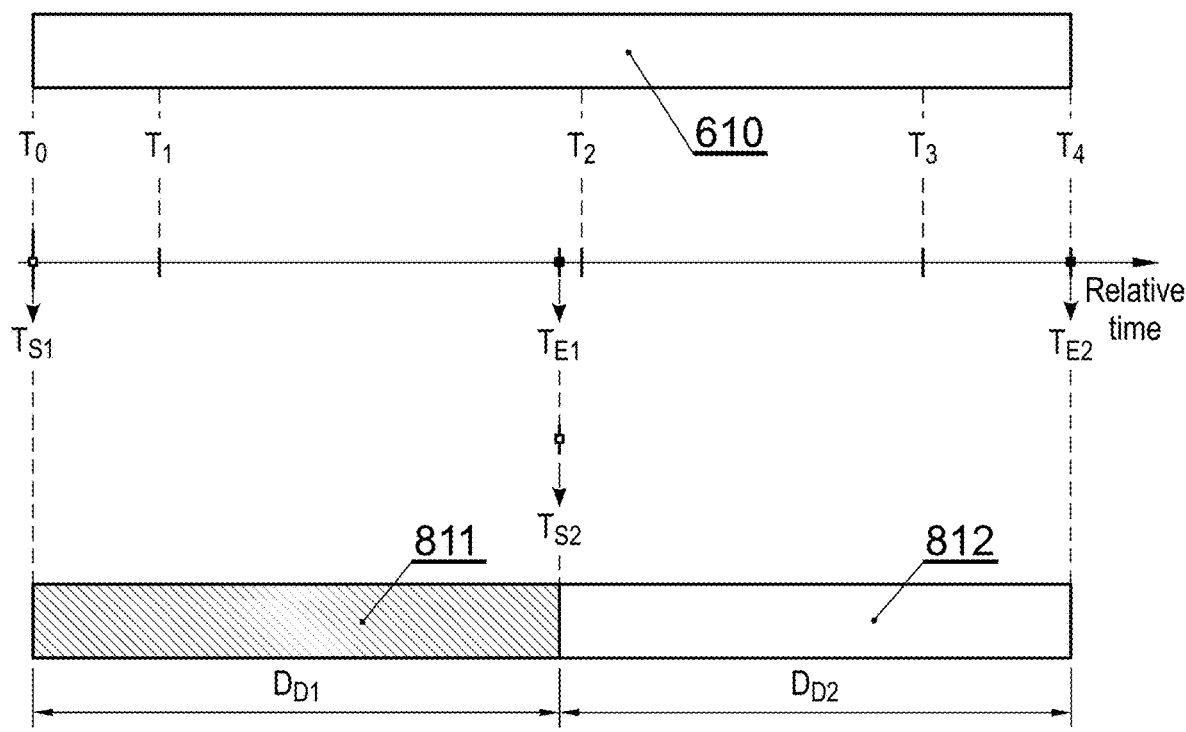

FIGS. 8A-D present different outcomes of analysis. In FIG. 8A a single program has been detected (810) in the given content (610). In FIG. 8B two distinct programs have been detected (811, 812) in the given content (610). A split between said programs has been detected at a time $T_{E1}$.

Figure 8C:
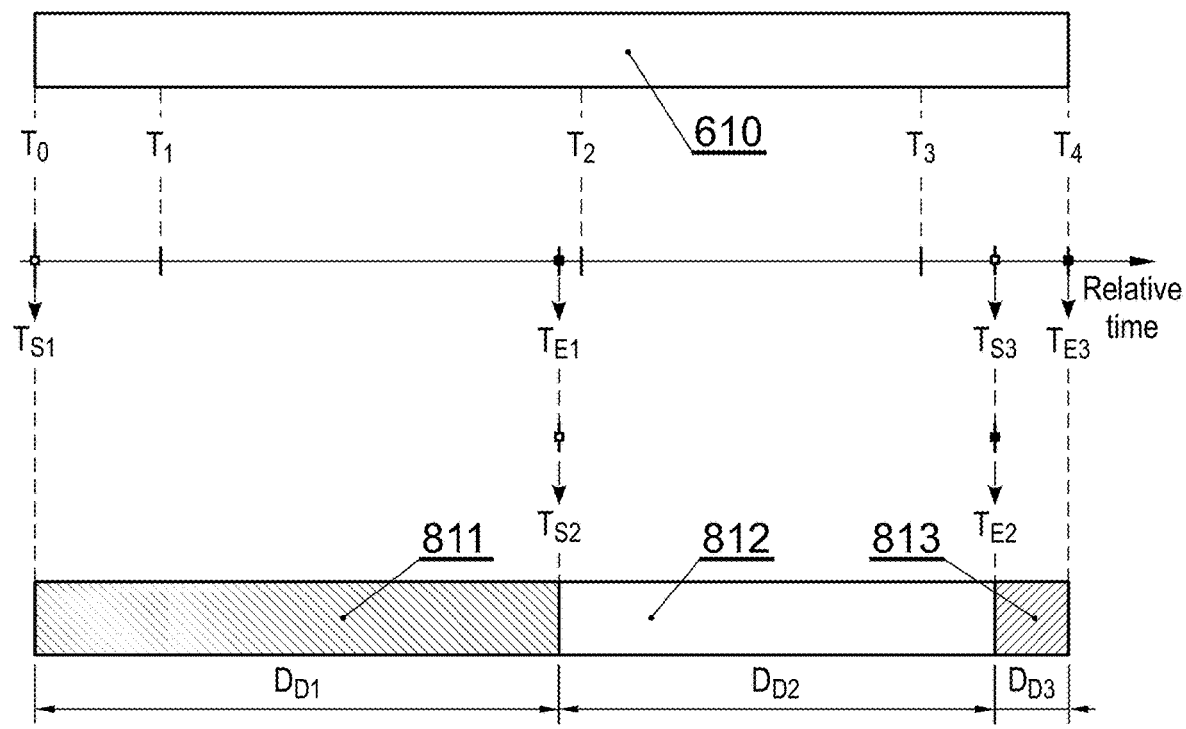

In FIG. 8C, three separate programs have been detected (811, 812, 813) in the given content (610). A split between said programs has been detected at times $T_{E1}$ and $T_{E2}$.

Figure 8D:
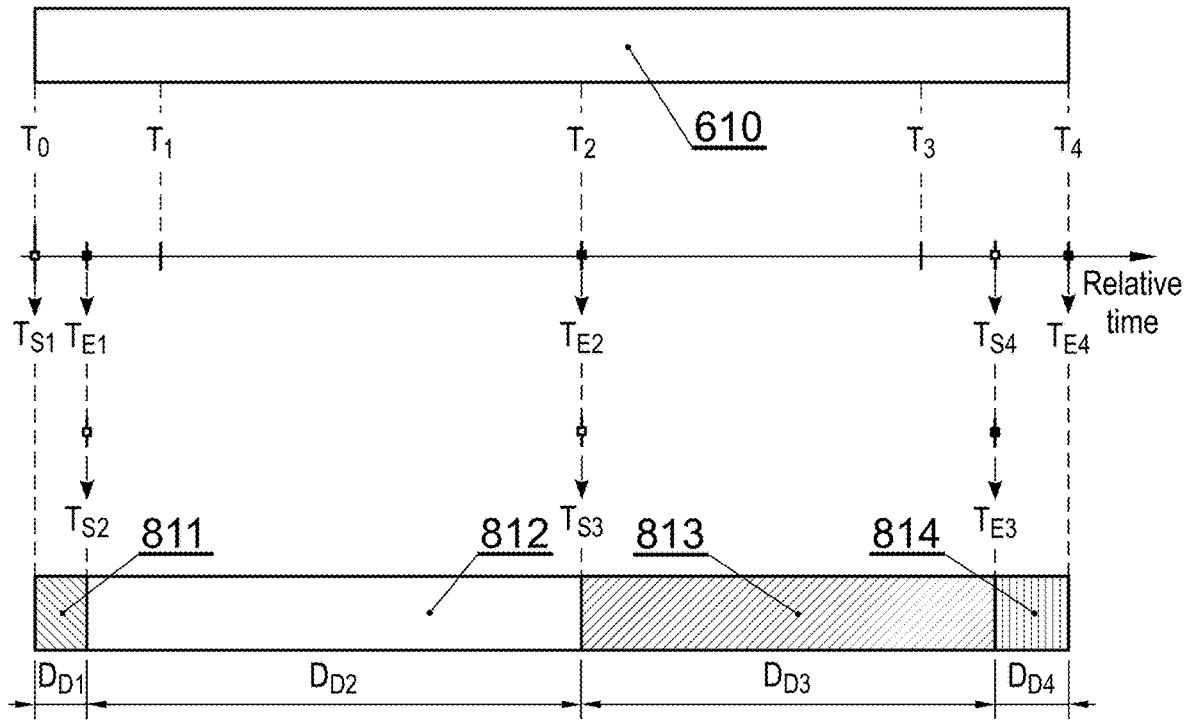

In case of embodiments shown in FIGS. 8B-D a user may be asked which content is to be stored or otherwise allow parts of the content may be stored and labeled appropriately.

In FIG. 8D, four separate programs have been detected (811, 812, 813, 814) in the given content (610). A split between said programs has been detected at times $T_{E1}$, $T_{E2}$ and $T_{E3}$. In such case a user may choose to discard the fractions of content items (811, 814) and choose to store two separate content items (812, 813).

Figure 9:
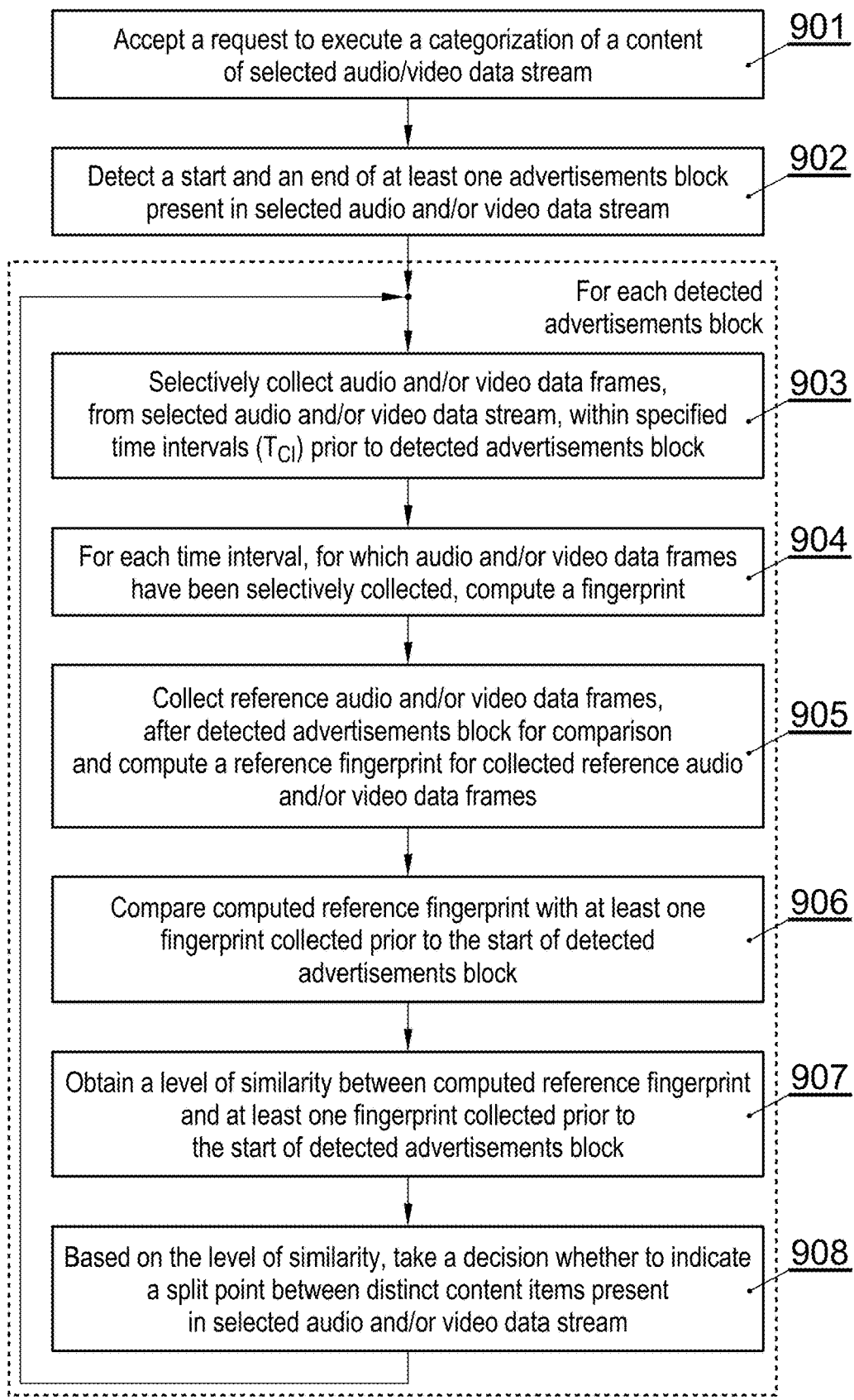
FIG. 9 presents a high level method according to the present invention.

FIG. 9 presents a high level method according to the present invention. The method starts from accepting a request to execute said categorization (901) of said content of an audio/video data stream. Next, there is executed detecting a start and an end of at least one advertisements block (902) present in said audio and/or video data stream.

Subsequently, for each detected advertisements block there are executed the steps of (903-908). The loop starts from selectively collecting audio and/or video data frames (903), from said audio and/or video data stream, within specified time intervals ($T_{Cj}$) prior to said detected advertisements block. The number of such time intervals may be user defined.

Then, for each time interval, for which audio and/or video data frames have been selectively collected, computing (904) a fingerprint and selectively collecting reference audio and/or video data frames (905), after said advertisements block, for comparison and computing a reference fingerprint for said reference audio and/or video data frames.

After that, the method executes comparing (906) said reference fingerprint with at least one fingerprint collected prior to the start of said advertisements block in order to obtain a level of similarity (907) between said fingerprints.

Lastly, based on the level of similarity, taking a decision whether to indicate a split point between distinct content items (908) present in said audio and/or video data stream.

Regarding the comparison process, when all source data fingerprints are available, there is executed a comparison of the reference fingerprint with each of the remaining fingerprints. As previously explained, the fingerprints, be it audio or video, are such that they may be compared in order to detect a match or a level of similarity.

When determining whether fingerprints are similar, there may be applied various approaches. A first approach may be to apply an average similarity level among given or all pairs. In this case an average similarity out of a given number of comparisons (e.g. an average similarity level above a given threshold denotes similar items). Another approach is to select top half of the results (or a subset of said results in general), say 4 results (e.g. an average similarity level, of the top results, above a given threshold denotes similar items). Yet another approach is to set a threshold for a top result, for example if any of the comparisons returns a similarity level above 90%, the similarity condition is assumed to have been matched.

In case the similarity condition is not fulfilled, the system considers that the current content is not continuous and a split may be suggested/made. Otherwise, in case the similarity condition is fulfilled, the system assumes that the content is continuous at a given location.

Figure 10A:
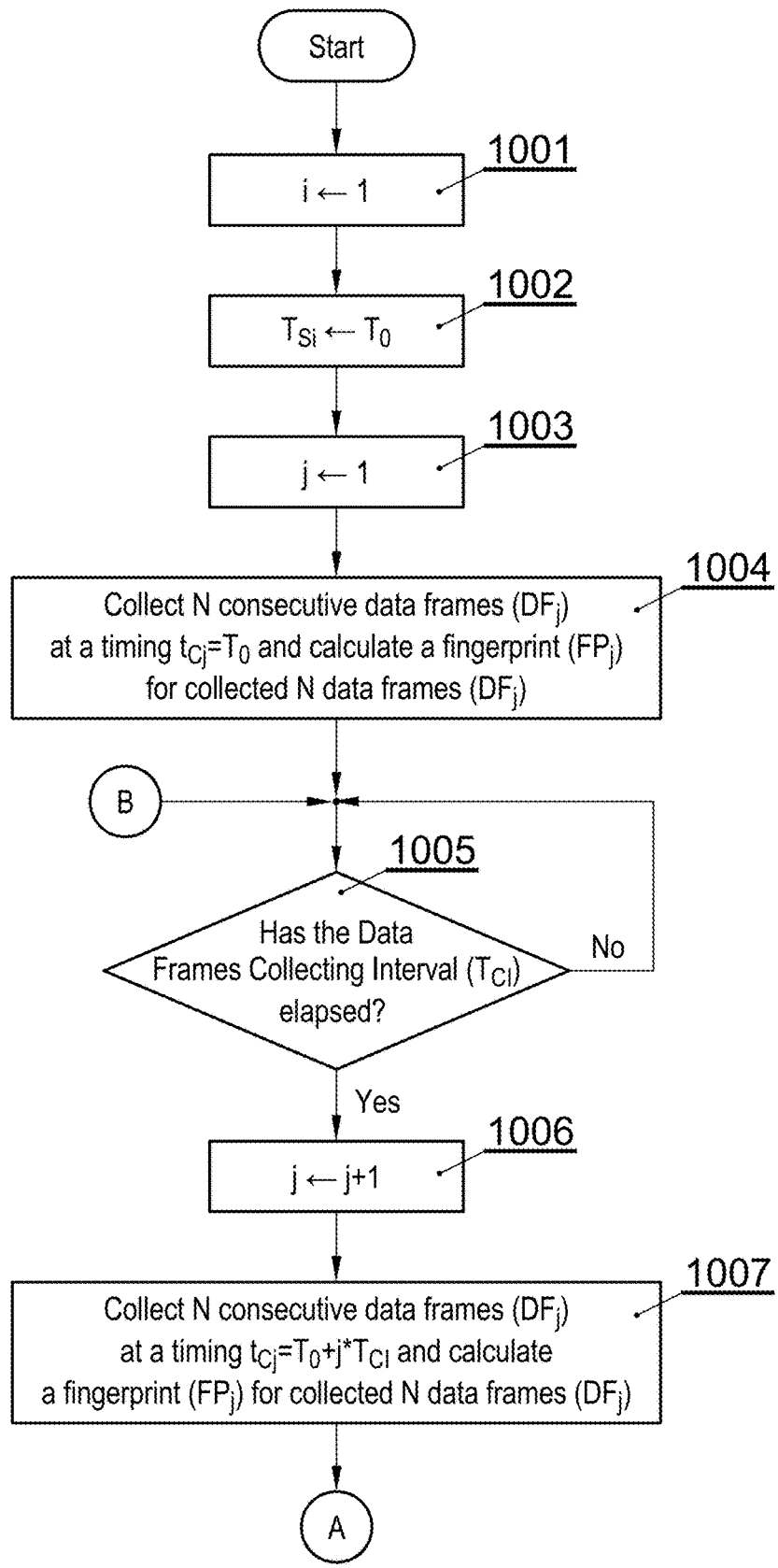
FIGS. 10A-B depict further details of the method according to the present invention.
Figure 10B:
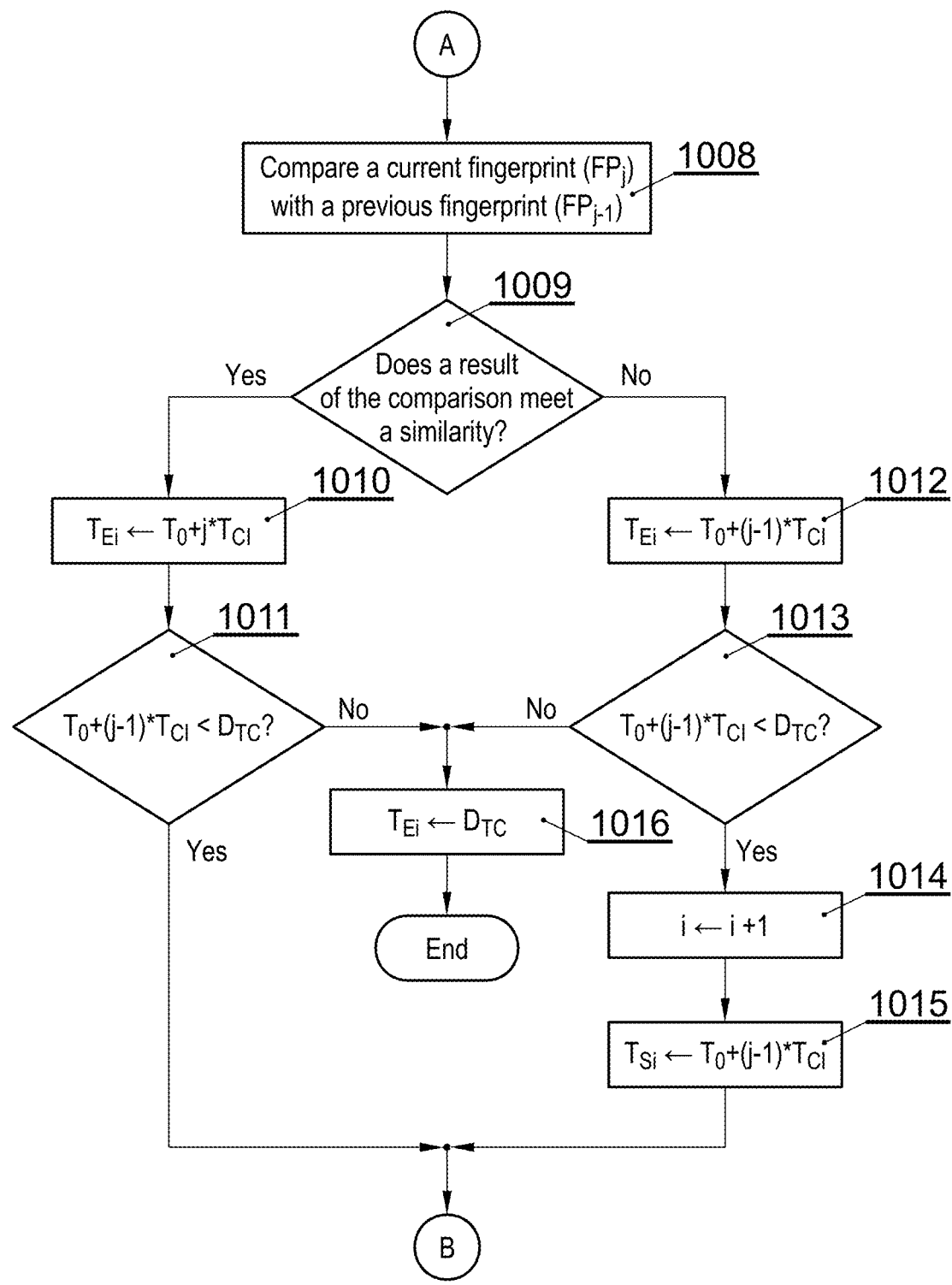

FIGS. 10A-B depict further details of the method according to the present invention. Steps (1001-1003) initialize the process by assuming index 1 for an i and j variables denoting data collecting interval and a fingerprint index respectively. A $T_{Si}$ variable is assigned a starting time $T_0$ of the content to be analyzed, meaning a start of the current content section.

Subsequently, at step (1004) there are collected N (270) consecutive data frames ($DF_j$) at a timing $t_{Cj}=T_0$ and calculated a fingerprint ($FP_j$) for the collected N data frames ($DF_j$).

Next, at step (1005) there is a check made whether the data frames collecting interval ($T_{CI}$) has already elapsed. In case it has, the method proceeds to step (1006) in order to increase the j index by 1. Otherwise, the method returns to step (1005).

Further, at step (1007) the method collects N consecutive data frames ($DF_j$) at a time $t_{Cj}=T_0+j*T_{CI}$ and calculates a fingerprint ($FP_j$) for collected N data frames ($DF_j$).

FIG. 10B starts at step (1008) from comparing a current fingerprint ($FP_j$) with the previous fingerprint ($FP_{j-1}$) and verifying similarity condition(s) (1009).

In case the similarity condition is met, the ending of the current content section is set as $T_{Ei} \leftarrow T_0+j*T_{CI}$ (1010) otherwise, the ending of the current content section is set as $T_{Ei} \leftarrow T_0+(j-1)*T_{CI}$ (1012).

Steps (1011) and (1013) verify whether an end of the currently analyzed content has been reached (the complete content to be categorized (510, 610)).

Step (1016) is executed in order to define that a content's end is the same as the end of the currently processed content's section.

If the condition of step (1013) is met, the method advances to step (1014) where the i variable is increased and subsequently to step (1015) where there is set a new beginning moment $T_{Si} \leftarrow T_0+(j-1)*T_{CI}$. After that, the method returns to point (B), which is the same for step (1011).

Figure 11A:
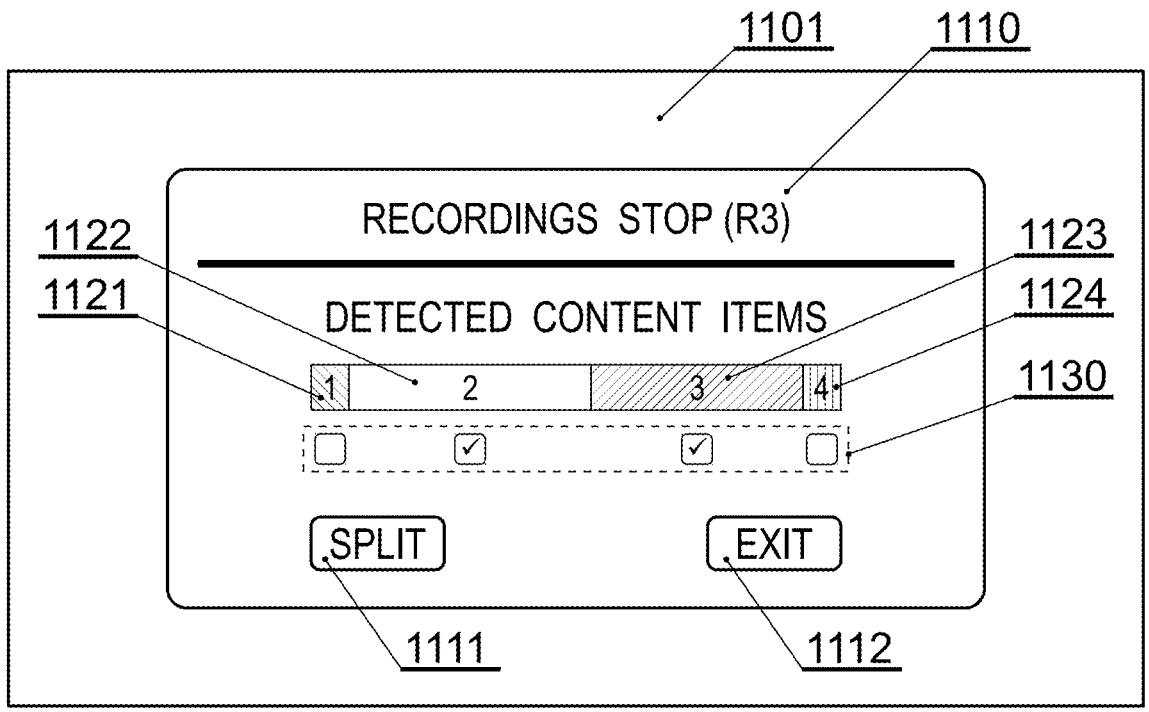
FIGS. 11A-B present graphical user interface of the system according to the present invention.
Figure 11B:
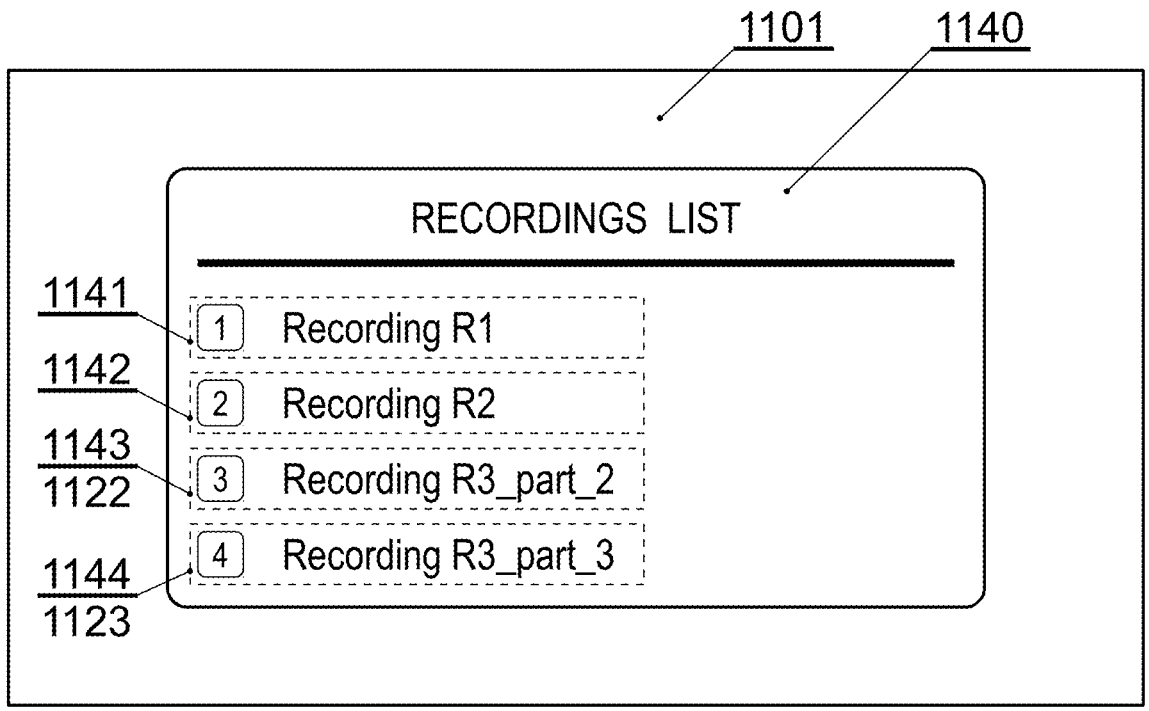

FIGS. 11A-B presents examples of graphical user interface (1101) that may be used in connection with the present invention. For example a scenario may be applied where a user decides to stop a current recording (1110). R3 is an example of a recording's name, which may be obtained via the EPG data.

When the request to stop is processed, the analysis according to the present invention may be applied over the already recorded content. An output of such analysis may be presented in a graphical form, which in this case lists four detected content items (1121-1124) within said recording.

A user may be given an opportunity to select any of these four detected content items (1121-1124) for storage as distinct recordings. In order to apply this selection, the user may select the SPLIT action (1111).

After such split, the recordings memory may comprise two separate recordings (1143, 1144) that have been kept as a result of the processing of the recording. An example of such recordings list has been shown in FIG. 11B.

In addition to a scenario of FIGS. 11A-B, the present method may be executed for any stored recording. This may be for example effected for the recording R1 (1141) using a suitable context menu that will invoke the categorization according to the present invention.

The method according to the present invention allows for more precise recording times and this results in decreasing storage requirements. Further, an event that has started and ended at times different than those indicated by an EPG, will be correctly identified. Therefore, the invention provides a useful, concrete and tangible result.

The present method analyzes audio and/or video data to automatically categorize audio/video content in an audio/video data receiver. therefore, the machine or transformation test is fulfilled and that the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for automatic categorization of audio/video content may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the invention presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. Method for automatic categorization of content of an audio/video data stream, the method being characterized in that it comprises the steps of: accepting a request to execute said categorization of said content of an audio/video data stream; detecting a start and an end of at least one advertisements block present in said audio and/or video data stream; for each detected advertisements block: selectively collecting audio and/or video data frames, from said audio and/or video data stream, within specified time intervals prior to said detected advertisements block; for each time interval, for which audio and/or video data frames have been selectively collected, computing a fingerprint; selectively collecting reference audio and/or video data frames, after said advertisements block, for comparison and computing a reference fingerprint for said reference audio and/or video data frames; comparing said reference fingerprint with at least one fingerprint collected prior to the start of said advertisements block in order to obtain a level of similarity between said fingerprints; based on the level of similarity, taking a decision whether to indicate a split point between distinct content items present in said audio/video data stream.

2. The method according to claim 1 wherein said selective collecting concerns collecting N of consecutive video data frames at defined timings.

3. The method according to claim 2 wherein a type of said video data frame is taken into consideration during said selective collecting.

4. The method according to claim 1 wherein said fingerprint is a data set, smaller than the referred data, that may be compared in order to determine a similarity level with another fingerprint.

5. The method according to claim 1 wherein when determining said level of similarity there is executed one of: computing an average similarity level among all fingerprints pairs; selecting a subset of top results; setting a threshold for a top result.

6. The method according to claim 1 wherein at least one of said time intervals falls after said end of the advertisements block.

7. The method according to claim 1 wherein said an audio/video data stream is initially processed so that each advertisements section is removed in order to arrive at an output content.

8. The method according to claim 7 wherein original timing information is preserved and it is known to the system to which time in the audio/video data stream the respective parts of the output content correspond.

9. A non-transitory computer readable medium storing computer-executable instructions performing all the steps of the computer-implemented method according to claim 1 when executed on a computer.

10. System for automatic categorization of content of an audio/video data stream, the system comprising: an audio and/or video data stream reception block; a memory configured to store temporary data as well as audio/video data stream; the system being characterized in that it further comprises: a controller configured to execute all steps of the method according to claim 1.

* * * * *